C. R. BORLAND.
SOUND RECORDER.
APPLICATION FILED FEB. 14, 1908.
911,937.
Patented Feb. 9, 1909.
2 SHEETS—SHEET 1.
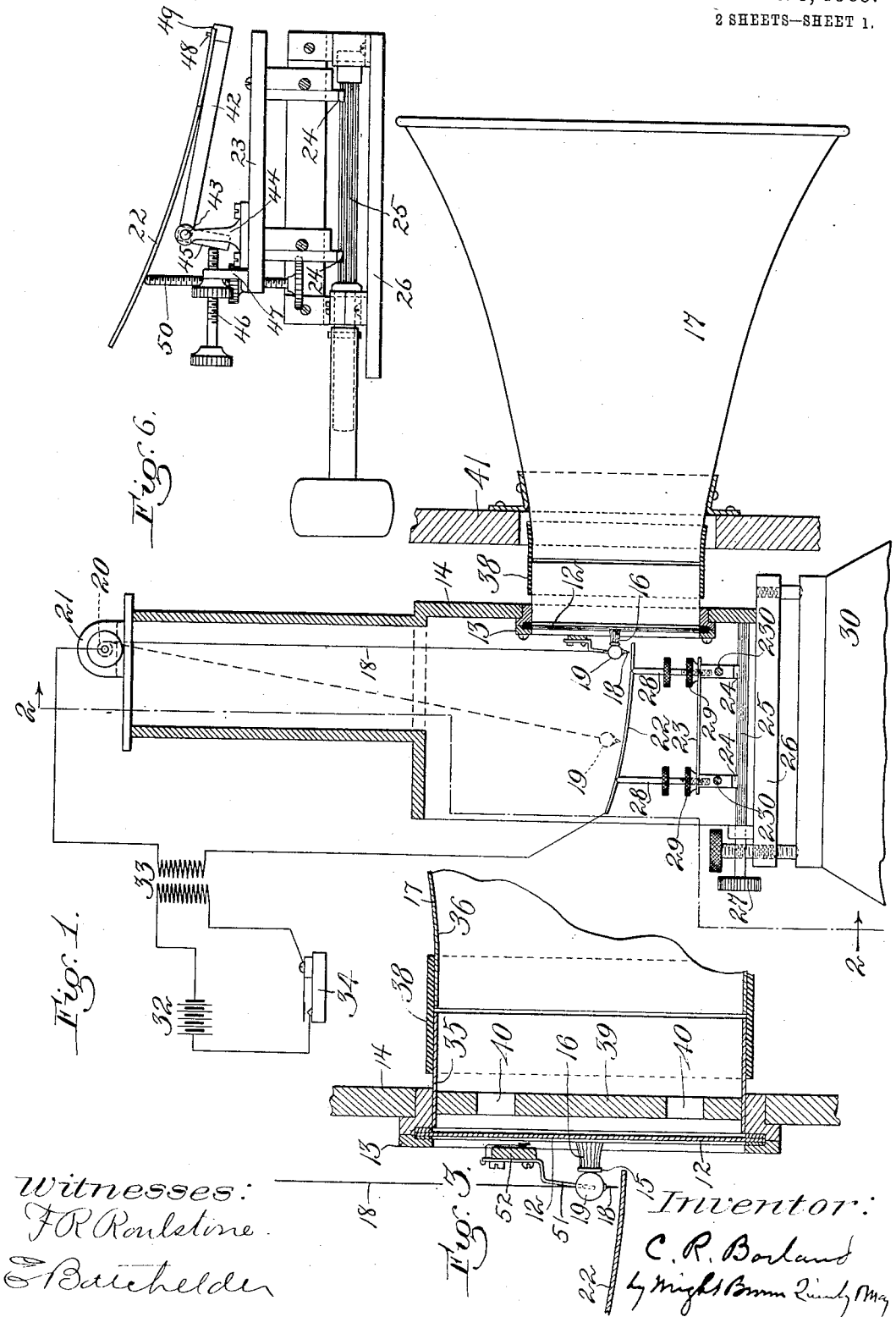

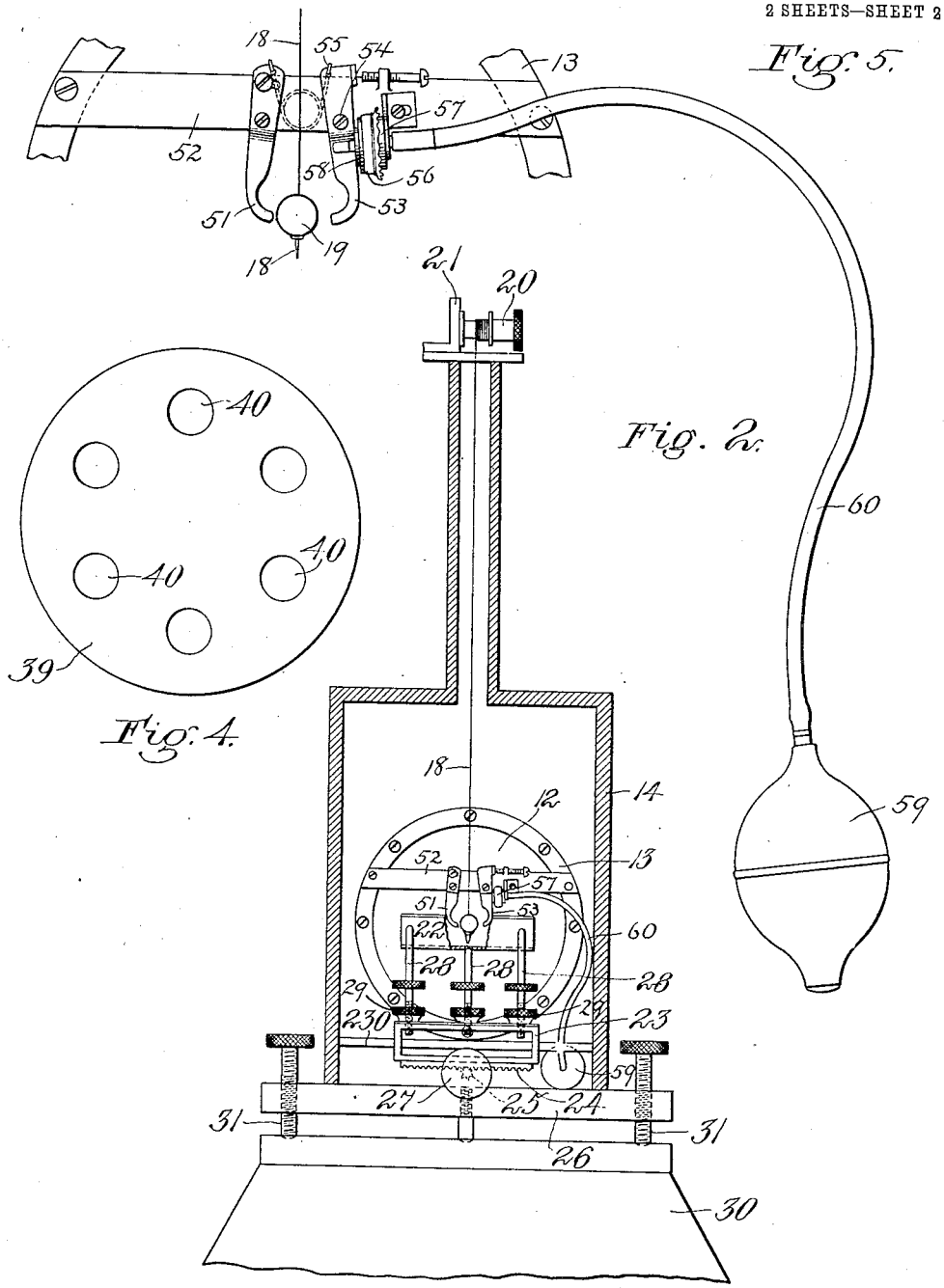

UNITED STATES PATENT OFFICE.

CHARLES R. BORLAND, OF CONCORD, MASSACHUSETTS, ASSIGNOR TO AMERICAN POWDER MILLS, OF BOSTON, MASSACHUSETTS, A CORPORATION OF MASSACHUSETTS.

SOUND-RECORDER.

No. 911,937.   Specification of Letters Patent.   Patented Feb. 9, 1909.

Application filed February 14, 1908. Serial No. 415,831.

*To all whom it may concern:*

Be it known that I, CHARLES R. BORLAND, of Concord, in the county of Middlesex and State of Massachusetts, have invented certain new and useful Improvements in Sound-Recorders, of which the following is a specification.

This invention has for its object to provide an apparatus for recording the force of sound vibrations, such as those produced by the explosion of powder in a fire arm or in an explosive structure, such as a cannon cracker, the result aimed at being to determine the regularity of the sound of the powder employed, and ascertain whether or not the powder is up to a given standard.

The invention also has for its object to provide an apparatus for the study of the behavior of loaded or blank ammunition, firecrackers, firework bombs and other explosives, by means of definite comparative sound measurement of the same when exploded or fired; also, to provide for the measurement of any sound produced by impact.

The invention is embodied in an apparatus comprising a marker which is freely movable by the force of sound vibration and by its own momentum, a stationary record tablet over which said marker is movable by momentum after its motion has been started, and means responsive to sound vibrations for starting the movement of the marker, the marker producing an elongated mark or record on the record tablet, the length of which indicates the effective force of the discharge.

Of the accompanying drawings, forming a part of this specification,—Figure 1 represents a longitudinal section of an apparatus embodying my invention. Fig. 2 represents a rear elevation, the casing of the apparatus being shown in section. Fig. 3 represents an enlargement of a portion of Fig. 1, showing a perforated septum in the sound-conducting passage. Fig. 4 represents a side elevation of said septum. Fig. 5 represents a fragmentary enlargement of portions of Fig. 2. Fig. 6 represents a modification of the means for supporting and adjusting the record tablet.

The same letters of reference indicate the same parts in all the figures.

For purposes of illustration, I have shown in the drawings the preferred embodiment of my invention, the same being described as follows:

12 represents a diaphragm adapted to respond to sound vibrations, and marginally clamped by a frame or holder 13 suitably attached to a casing 14. The diaphragm is or may be of the same material and construction as a diaphragm of an ordinary telephone receiver, and is preferably provided at its central portion with a hammer projecting from the rear side of the diaphragm, and composed of a steel face 15 and a shank or body 16 of wood or other insulating material, attached to the face and to the central portion of the diaphragm.

17 is a sound conducting horn inclosing a space which terminates at the outer side of the diaphragm.

A freely movable marker is employed, which is preferably composed of a slender steel wire 18 which depends from a support elevated above the diaphragm, and constitutes a pendulous marker, the movement of which is limited in one direction by the diaphragm, the wire 18 being preferably provided with a spherical weight 19, which rests loosely against the hammer when the marker is at rest, as shown by full lines in Fig. 1. A movement of the diaphragm caused by sound vibrations impinging upon it, will set the marker in motion or start its movement, the marker moving being free to move by its own momentum away from the diaphragm as indicated by dotted lines in Fig. 1 a distance dependent on the amplitude of vibration of the diaphragm and the force of the sound vibrations acting upon it, the length of the movement of the marker being many times greater than the movement of the diaphragm. The support for the marker is preferably a drum 20, on which a portion of the wire is wound, said drum being rotatable in a bearing 21, with which it is engaged by friction or otherwise, so that the wire may be lengthened and shortened to raise and lower its lower end or acting portion.

22 represents a record tablet, which is supported as hereinafter described, below the marker, and is curved in the arc of a circle conforming to the path of the marker the tablet being concave in the direction of said path. The tablet is preferably a plate of metal, which is a conductor of electricity, and its upper surface is prepared to receive a record by suitable means, such as a film of carbon deposited upon its upper surface by the action of smoke, this treatment being advisable when the record is produced by the action of an electrical spark, as hereinafter described, the marker being separated from the record surface by a spark gap. The marker may, however, be arranged to have actual contact with the record surface, and mechanically form a record thereon, although this arrangement is open to the objection of frictional resistance to the movement of the marker, which resistance is avoided by the use of an electric current, as described later. The tablet 22 does not move when the apparatus is in use, but is normally stationary, and is adjustable crosswise of the path of the marker, so that different parts of the surface of the tablet may be presented to the marker, thus enabling a plurality of measurable records to be made on the tablet, each record being separated from the next by an intervening space. The tablet is supported by a carriage 23, which is movable horizontally in the casing 14, and is provided with racks 24 engaging an elongated pinion 25 journaled in bearings on a base plate 26, which plate supports the casing 14. The pinion 25 is provided with a milled head 27, whereby it may be rotated to horizontally adjust the carriage and tablet. The carriage is preferably provided with means for vertically adjusting the tablet toward and from the marker, said means comprising screw-threaded standards 28, on the upper ends of which the tablet 22 rests loosely. The threaded portions of the standards 28 are engaged with sockets in the carriage, and may be raised and lowered by their rotation in said sockets, and secured by means of nuts 29 engaged with the screw threads of the standards, and resting on the carriage. The base plate 26 is supported by a foundation 30, which is preferably a solid pier of concrete or masonry, the base plate having bearing screws 31 resting on said pier. When the apparatus is constructed to form a record by the action of an electric spark passing between the marker and the tablet, the said parts are made of material which is a conductor of electricity, and are included in an electric circuit, which includes a battery 32 or other source of electrical energy, an induction coil 33 and a circuit closer 34, suitable conducting wires being provided to include the parts 32, 33 and 34 in circuit with the marker and the tablet, as indicated diagrammatically in Fig. 1.

When the apparatus is to be operated, the explosive to be tested is located in suitable proximity to the mouth of the horn, the circuit is closed, and the explosive is fired. The sound vibrations acting on the diaphragm move the marker away from the diaphragm, the movement of the diaphragm overcoming the inertia of the marker and causing it to move by its own momentum over the stationary tablet. At the same time an electric spark passes between the marker and the record tablet, causing the formation of a line of dots upon the tablet, the length of which line indicates the force of the discharge. The marker then returns by gravitation to its position of rest, and the circuit is broken. The apparatus may then be prepared for another operation by adjusting the carriage horizontally to bring a fresh part of the tablet in position to receive the next record.

To reduce to the minimum any possible effect from the vibrations of the horn on the diaphragm, I make the horn in two sections; viz., a short inner section 35, which is rigidly mounted adjacent to the diaphragm, and an elongated outer section 36, which is free from contact with the inner section, and is connected therewith by a flexible coupling 38, preferably a band or rubber. This coupling absorbs such vibrations as may be imparted to the main body of the horn by wind, the trembling of the building, etc.

To concentrate the sound vibrations on the diaphragm at points between its center and margin, I provide a fixed septum 39, which may be a plate of wood filling the interior of the horn in close proximity to the diaphragm, said septum having a circular series of orifices 40 between its center and margin, these orifices concentrating the sound vibrations upon corresponding portions of the diaphragm, and thus increasing the effect of the vibrations upon the diaphragm, the orifices 40 being opposite the portions of the diaphragm which are located between the center and margin of the latter.

41 represents a portion of the wall of a building or inclosure in which the apparatus is located, the inner section of the horn passing through the wall 41.

In Fig. 6 I show a modification of the tablet-supporting means shown in Figs. 1 and 4, said modification including an arm 42 pivoted at 43 to standards 44 attached to the carriage 23, and provided with a shorter arm 45 which bears against an adjustable stop screw 46 mounted in a bracket 47 affixed to the carriage. One end of the tablet 22 is detachably engaged with a pin 48 on the outer end of the arm 42, the tablet having an orifice which receives the pin 48, while the arm 42 has a shoulder 49 against which one end of the tablet bears loosely. The opposite end portion of the tablet 22 rests upon vertically adjustable screw-threaded standards 50, which correspond to two of the standards 28, shown in Figs. 1 and 2. An adjustment of the screw 46 raises or lowers the outer end of the arm 42, and varies the height of the portion of the tablet engaged with said arm. An adjustment of the standards 50 varies the height of the portion of the tablet resting on said standards.

To insure the location of the pendulous marker 18 at a predetermined point with relation to the diaphragm hammer when it is at rest, I provide a fixed stop 51 attached to a cross bar 52, which is secured to the diaphragm frame 13, and is adapted to bear against one side of the weight 19, and a movable stop 53 pivoted at 54 to said cross bar, and is movable toward and from the stop 51. A spring 55 normally retracts the movable stop 53, and holds it against a flexible or elastic diaphragm 56, which forms one side of an air chamber 57 supported by the cross bar 52, the movable stop 53 having a plate or head 58 which bears loosely against the diaphragm. 59 represents an elastic compressible bulb connected by a flexible tube 60 with the air chamber 57. When the weight 19 gravitates against the diaphragm hammer, it is liable to oscillate loosely in a direction transverse to the plane in which it is moved by the diaphragm. To prevent this transverse oscillation, is the object of the stops 51 53 and the pneumatic mechanism above described, the stop 51 being arranged in close proximity to one side of the weight 19 when the latter is in the exact predetermined position relative to the hammer. The movable stop 53 is adapted to be forced yieldingly against the weight 19 by the compression of the bulb 59, to press the weight against the fixed stop 51, and thus bring the weight and the marker to a condition of rest. When the bulb is released, the spring 55 retracts the movable stop 53, leaving the weight free to be displaced by the previously described action of the diaphragm.

I claim:

1. A sound recorder comprising a marker which is movable by its own momentum, a normally stationary record tablet conforming to the path of the marker, and means responsive to sound vibrations for starting the movement of the marker.

2. A sound recorder comprising a freely movable marker, a normally stationary record tablet over which said marker is movable by its own momentum, and means responsive to sound vibrations for starting the movement of the marker in one direction, the marker being movable by gravitation in the opposite direction.

3. A sound recorder comprising a marker movable freely in opposite directions, a normally stationary record tablet coöperating with the marker, and a diaphragm which limits the movement of the marker in one direction, the marker being movable from the diaphragm and independently thereof by its own momentum, and movable toward the diaphragm and independently thereof by gravitation.

4. A sound recorder comprising a marker movable by its own momentum, normally stationary record tablet, means for effecting a lateral adjustment of one of said parts to separate the records on the tablet, and means responsive to sound vibrations for starting the movement of the marker, relatively to the tablet.

5. A sound recorder comprising a marker movable by its own momentum, a normally stationary record tablet, means for adjusting one of said parts toward and from the other, to vary the distance between the tablet and marker, and means responsive to sound vibrations for starting the movement of the marker.

6. A sound recorder comprising a marker movable by its own momentum, a normally stationary record tablet, means for adjusting the tablet crosswise of the path of the marker to present different parts of its surface to the marker, and thereby separate the records on the tablet, and means responsive to sound vibrations for starting the movement of the marker.

7. A sound recorder, comprising a marker movable by its own momentum, means responsive to sound vibrations for starting the movement of the marker, a normally stationary record tablet, a carriage supporting said tablet, and movable crosswise of the path of the marker, and mechanism for moving said carriage to present different parts of the tablet to the marker, and thereby separate the records on the tablet.

8. A sound recorder comprising a marker movable by its own momentum, means responsive to sound vibrations for starting the movement of the marker, a normally stationary record tablet, a carriage supporting said tablet, and having means for adjusting the tablet toward and from the marker, and mechanism for moving the carriage to present different parts of the tablet to the marker, and thereby separate the records on the tablet.

9. A sound recorder comprising a pendulous marker movable by its own momentum, a diaphragm which limits the movement of the marker in one direction, a normally stationary concave record tablet under the marker, and means for raising and lowering the marker to vary its distance from the tablet.

10. A sound recorder comprising a marker movable by its own momentum, a normally stationary record tablet over which the marker is movable, and from which its terminal is separated by a spark gap, said marker and tablet being of conducting material, means responsive to sound vibrations for starting the movement of the marker, and means for sending an electric current through the marker and tablet to produce a record on the latter.

11. A sound recorder comprising a pendulous marker movable by its own momentum, a diaphragm adapted to start the movement of the marker, a normally stationary concave record tablet under the marker, the said tablet and marker being of conducting material, and means for sending an electric current through the marker and tablet to produce a record on the latter.

12. A sound recorder comprising a pendulous marker movable by its own momentum, a diaphragm adapted to start the movement of the marker, a normally stationary concave record tablet under the marker, the said tablet and marker being of conducting material, a source of electrical energy, and an induction coil in circuit with the tablet and marker, and means for breaking and closing said circuit.

13. A sound recorder comprising a diaphragm having a hammer affixed to its central portion, a pendulous marker having a weight normally resting by gravitation against said hammer and separable therefrom by momentum, and a normally stationary record tablet operatively related to the marker.

14. A sound recorder comprising a diaphragm, a pendulous marker normally resting by gravitation against the diaphragm and separable therefrom by momentum, and means adjacent to the diaphragm for bringing the marker to rest in a predetermined position.

15. A sound recorder comprising a pendulous marker, a diaphragm which limits the movement of the marker in one direction, and is adapted to move it in the opposite direction, a fixed stop arranged in close proximity to one side of the marker when the latter is at rest, and means for pressing the marker against said stop.

16. A sound recorder comprising a pendulous marker, a diaphragm which limits the movement of the marker in one direction, and is adapted to move in the opposite direction, a fixed stop arranged in close proximity to one side of the marker when the latter is at rest, a movable stop which is movable toward and from the fixed stop, and normally retracted from the latter, and pneumatic means for forcing the movable stop toward the fixed stop.

17. A sound recorder comprising a pendulous marker, a diaphragm which limits the movement of the marker in one direction, and is adapted to move it in the opposite direction, a fixed stop arranged in close proximity to one side of the marker when the latter is at rest, a movable stop which is movable toward and from the fixed stop, and normally retracted from the latter, an air chamber, one side of which is composed of a flexible diaphragm against which the movable stop is normally held, and means for forcing air into said chamber.

18. An apparatus for the purpose stated, having means for utilizing sound vibrations to produce a record of their amplitude, said means including a normally stationary tablet, a diaphragm, and means responsive to vibrations of the diaphragm for producing on said tablet an elongated measurable record, the length of which is determined by and is greater than the amplitude of the said vibrations.

In testimony whereof I have affixed my signature, in presence of two witnesses.

CHARLES R. BORLAND.

Witnesses:
C. F. BROWN,
P. W. PEZZETTI.